(12) United States Patent
Williams et al.

(10) Patent No.: US 7,333,350 B2
(45) Date of Patent: *Feb. 19, 2008

(54) SELF DRIVEN SYNCHRONOUS RECTIFIER SHUTDOWN CIRCUIT AND METHOD

(75) Inventors: David Arthur Williams, Andover, MA (US); Donald R Caron, Windham, NH (US); Ram Ramabhadran, Waltham, MA (US)

(73) Assignee: Power One, Inc., Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/614,908

(22) Filed: Dec. 21, 2006

(65) Prior Publication Data

US 2007/0103819 A1   May 10, 2007

Related U.S. Application Data

(63) Continuation of application No. 10/843,406, filed on May 10, 2004, now Pat. No. 7,203,041.

(60) Provisional application No. 60/567,123, filed on Apr. 30, 2004.

(51) Int. Cl.
   *H02M 3/335* (2006.01)
(52) U.S. Cl. .................. 363/17; 363/53; 363/127
(58) Field of Classification Search .......... 363/17, 363/50, 53, 56.01, 56.02, 56.03, 56.05, 95, 363/98, 127
   See application file for complete search history.

(56) References Cited

U.S. PATENT DOCUMENTS

| | | | |
|---|---|---|---|
| 3,832,621 A | 8/1974 | Kornrumpf et al. | |
| 3,961,613 A | 6/1976 | Canup | |
| 4,647,830 A | 3/1987 | Bees | |
| 4,914,558 A | 4/1990 | Flickinger | |
| 4,926,304 A | 5/1990 | Marinus | |
| 5,726,869 A * | 3/1998 | Yamashita et al. | ....... 363/21.06 |
| 5,870,299 A | 2/1999 | Rozman | |
| 5,877,951 A | 3/1999 | Mweene | |
| 5,940,287 A | 8/1999 | Brkovic | |
| 6,181,578 B1 * | 1/2001 | Fronk | ....... 363/21.06 |
| 6,275,401 B1 | 8/2001 | Xia | |
| 6,370,047 B1 | 4/2002 | Mallory | |
| 6,370,051 B1 | 4/2002 | Patel | |
| 6,373,726 B1 | 4/2002 | Russell | |
| 6,392,901 B1 | 5/2002 | Colver | |
| 6,461,172 B2 | 10/2002 | Ross | |
| 6,501,193 B1 | 12/2002 | Krugly | |

(Continued)

OTHER PUBLICATIONS

Selders Jr., Robert, "Synchronous Rectification in High-Performance Power Converter Design", National Power Designer No. 112, 2006, www.power.national.com/designer.

*Primary Examiner*—Jeffrey Sterrett
(74) *Attorney, Agent, or Firm*—SoCal IP Law Group LLP; Steven C. Sereboff; John E. Gunther

(57) ABSTRACT

There is disclosed a power conversion circuit comprising a transformer having a primary side driven by an input section and a secondary side connected to first and second self-driven synchronous rectifiers. A shutdown section includes a control section adapted to detect a predetermined condition and means for shorting a winding of the transformer upon detection of the predetermined condition.

13 Claims, 5 Drawing Sheets

U.S. PATENT DOCUMENTS

| | | | |
|---|---|---|---|
| 6,504,739 B2 * | 1/2003 | Phadke | 363/127 |
| 6,570,770 B1 | 5/2003 | Ross | |
| 6,577,220 B2 | 6/2003 | Liu | |
| 6,587,344 B1 | 7/2003 | Ross | |
| 6,657,872 B2 | 12/2003 | Chapuis | |
| 6,661,209 B2 | 12/2003 | Patel | |
| 7,102,898 B2 * | 9/2006 | Brkovic | 363/19 |
| 7,203,041 B2 * | 4/2007 | Williams et al. | 361/20 |
| 2001/0048606 A1 | 12/2001 | Mallory | |
| 2002/0071291 A1 | 6/2002 | Johnson | |
| 2002/0118504 A1 | 8/2002 | Chapuis | |
| 2002/0186034 A1 | 12/2002 | Keating | |
| 2003/0090247 A1 | 5/2003 | Patel | |
| 2004/0174721 A1 * | 9/2004 | Yamamoto | 363/19 |
| 2005/0243481 A1 * | 11/2005 | Williams et al. | 361/18 |
| 2006/0133116 A1 * | 6/2006 | Schaible et al. | 363/17 |
| 2007/0103819 A1 * | 5/2007 | Williams et al. | 361/20 |

* cited by examiner

US 7,333,350 B2

SELF DRIVEN SYNCHRONOUS RECTIFIER SHUTDOWN CIRCUIT AND METHOD

RELATED APPLICATION INFORMATION

This application is a continuation of U.S. application Ser. No. 10/843,406, filed May 10, 2004, now U.S. Pat. No. 7,203,041 entitled "Primary Side Turn-Off of Self-Driven Synchronous Rectifiers," which in turn claims priority from U.S. Provisional Application No. 60/567,123 filed Apr. 30, 2004 and entitled, "Primary Side Turn-Off of Self-Driven Synchronous Rectifiers."

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field

The present invention relates to power converters.

2. Description of the Related Art

Advancements in the electronic arts have resulted in increased integration of electronic devices onto reduced circuit form factors. This trend has driven a demand for power supplies that provide very high efficiency. One type of DC/DC power converter—employing self-driven synchronous rectifiers, provides relatively high efficiency in low output power applications.

DETAILED DESCRIPTION OF THE INVENTION

Throughout this description, the embodiments and examples shown should be considered as exemplars, rather than limitations on the apparatus and methods of the present invention.

Description of Apparatus

Figure 1:
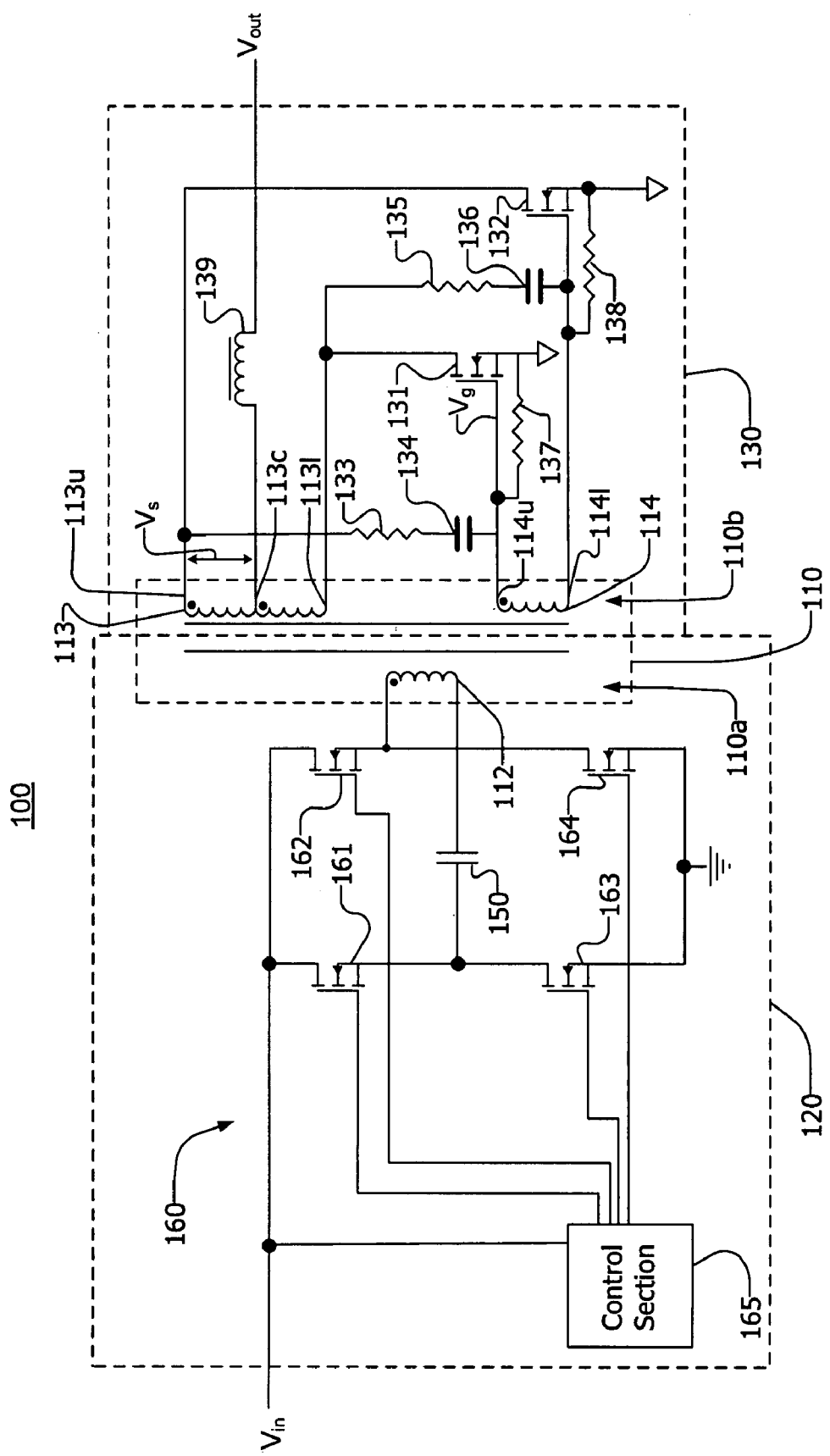
FIG. 1 is a first power conversion circuit.

Referring now to FIG. 1, there is shown a power conversion circuit 100 which may be included in a power converter, such as a DC/DC converter. The power conversion circuit 100 is merely one of many possible employing self-driven synchronous rectifiers. The power conversion circuit 110 may be any transformer isolated topology, including forward converters, flyback converters and bridge type converters. The power conversion circuit 100 may be hard switched, soft switched, and/or resonant. Power conversion circuits may include various solid state, discrete and other components.

The power conversion circuit 100 may include a transformer 110, an input section 120 and an output section 130. The input section 100 may be a full bridge primary circuit. The input section 120 may receive power at an input $V_{in}$, and the output section 130 may deliver power at an output $V_{out}$. The input power and the output power may be DC, and the power conversion circuit 100 is adapted to convert the expected input power to output power having desired characteristics (e.g., voltage, current).

The transformer 110 is disposed between and coupled to the input section 120 and the output section 130. The transformer 110 has a primary side 110a and a secondary side 110b. The transformer 110 may be ideal, substantially ideal, or not at all ideal.

The primary side 110a may include a main winding 112 and other windings. The secondary side 110b may include a main winding 113, an auxiliary winding 114 and other windings. The primary main winding 112 is included in the input section 120. The secondary side 110b windings 113, 114 are included in the output section 130. The windings 112, 113, 114 are shown with the dot convention to indicate polarity. The windings 112, 113, 114 may be wound on a common core (not shown). The core may be iron, another magnetic material or otherwise. The transformer 110 may have other configurations and materials, and may be replaced with other devices providing the same or similar functionality.

The secondary main winding 113 includes an upper terminal 113u, a lower terminal 113l and a center tap 113c. Thus, the input voltage to the secondary main winding 113 may be alternated from one to the other to be rectified. The upper terminal 113u and the center tap 113c define an upper portion of the secondary main winding 113. The lower terminal 113l and the center tap 113c define a lower portion of the secondary main winding 113.

A driving voltage $V_s$ is defined across the upper terminal 113u and the center tap 113c. The same driving voltage $V_s$ may be present across the lower terminal 113l and the center tap 113c, though the polarity of the driving voltage for the lower portion of the main winding 113 is opposite that of the upper portion due to their respectively opposite polarities. The center tap 113c may be at other positions than the mid-point of the main winding 113, and this and other reasons may result in differing driving voltages across the upper portion and lower portion of the main winding 113.

The output section 130 may comprise first and second rectifiers 131, 132, first, second, third and fourth resistors 133, 135, 137, 138, first and second capacitors 134, 136 and a choke 139, as well as other circuit elements.

The rectifiers 131, 132 may be MOSFETs having integral reverse rectifiers or equivalent switches. The rectifiers 131, 132 have respective activation terminals, and if embodied as MOSFETS, have respective gates (corresponding to the activation terminals), sources and drains. For convenience, the rectifiers' activation terminals are referred to herein as gates. A gate drive voltage $V_g$ is defined from the gate of either rectifier 131, 132 to common. Instead of the MOSFETs, IGBTs, TRIACs, rectifiers in combination with controllable switches (e.g., transistors, relays), and other devices and combinations of devices could be used.

The rectifiers 131, 132 may be synchronous and self-driven. They are "synchronous" because, under normal operations, the rectifiers 131, 132 are gated on and off to coincide with the operation of MOSFETs in the input circuit 110a. They are "self-driven" because their on and off operation is controlled by the output section 130, rather than by a separate controller or control circuit (e.g., an external controller).

The upper terminal 113u is connected to the drain of the second rectifier 132 and to the first resistor 133. The opposite terminal of the first resistor 133 is connected to the first capacitor 134. The first capacitor 134 is connected to the gate of the first rectifier 131, the third resistor 137 and the upper terminal 114u. The third resistor 137 and the source of the first rectifier 131 are both connected to common. The capacitors 134, 136 in combination with the resistors 133, 135 provide bypasses to reduce noise and provide additional gate drive current to improve efficiency.

The lower terminal 113l is connected to the drain of the first rectifier 131 and to the second resistor 135. The opposite terminal of the second resistor 135 is connected to the second capacitor 136. The second capacitor 136 is connected to the gate of the second rectifier 132, the fourth resistor 138 and the lower terminal 114l. The fourth resistor 138 and the source of the second rectifier 132 are both connected to common.

The secondary auxiliary winding includes an upper terminal 114u and a lower terminal 114l. The upper terminal 114u is connected to the gate of the first rectifier 131. The lower terminal 114l is connected to the gate of the second rectifier 132.

The center tap 113c is connected to the choke 139. The output $V_{out}$ is drawn from the choke 139. The choke 139 is a substantially loss-less path for direct current and a substantially infinite impedance for alternating current.

The input section 110 may include a power section, which itself may also be used as a shutdown section 160. The shutdown section 160 includes upper 161, 162 and lower 163, 164 switches, the primary main winding 112, and a control section 165. The switches 161, 162, 163, 164 may be MOSFETs as described above. Although shown integrated with the shutdown section 160, the control section 165 may be separate from the shutdown section 160, from the input section 120 and even the power conversion circuit 100 itself. The control section 165, at appropriate times, causes a short in a primary winding, such as the primary main winding 112. This short may be for a full winding, for one or more turns of a winding, or may be effective as a short of a full winding. References to "shorting a winding" and "shorting a turn" are intended to be interchangeable and to include any type of short which provides this effect.

The control section 165 senses for one or more predetermined conditions, and then turns on or turns off the switches 161, 162, 163, 164 as the case may be. The predetermined conditions may be for example, (a) falling below the undervoltage lockout point (UVLO) level, (b) over-current, (c) over-temperature, or (d) some other designated fault or non-fault condition. The control section 165 may be one or more discrete and/or integrated devices. The control section 165 may receive power from the input voltage $V_i$, and/or may receive power from another source (e.g., a primary auxiliary winding). Instead of sending a signal on an output, the control section may cause activation of the shutdown section (e.g., a turn to be shorted) in a different way.

By turning on the lower switches 163, 164, the primary main winding 112 is shorted. This places the transformer 110 into a lower impedance state that will not allow it to provide the energy needed for the synchronous rectifiers to self-oscillate. Alternatively, the upper switches 161, 162 may be turned on and the lower switches 163, 164 turned off to obtain the same effect.

The shutdown section 160 may include a DC blocking capacitor 150 in series with the primary main winding 112.

Figure 5:
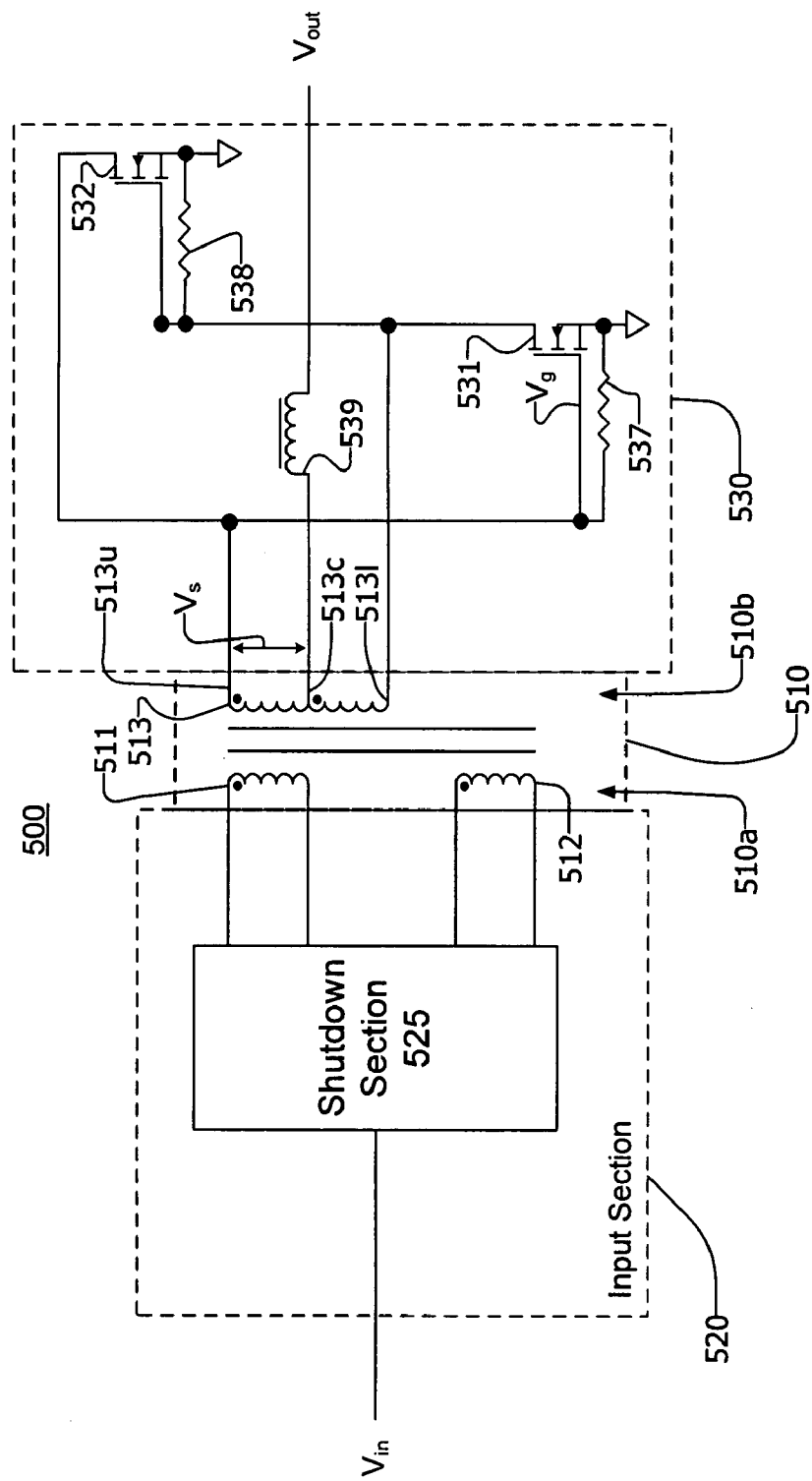
FIG. 5 is a second power conversion circuit.

The auxiliary drive winding 114 is not needed to switch the gates of the rectifiers 131, 132. They can be driven by the opposite windings or by coupling the drains to the opposite gates. This may be done, for example, in low output voltage converters where the voltage per turn is less. Referring now to FIG. 5, there is shown another power conversion circuit 500 which may be included in a power converter, such as a DC/DC converter. The power conversion circuit 500 of FIG. 5 is similar to that of FIG. 1, but lacks the auxiliary secondary winding 114, and attendant RC sections.

The power conversion circuit 500 includes a transformer 510, an input section 520 and an output section 530. The input section 520 may receive power at an input $V_{in}$, and the output section 530 may deliver power at an output $V_{out}$.

The transformer 510 has a primary side 510a and a secondary side 510b. The transformer 510 may be ideal, substantially ideal, or not at all ideal. The primary side 510a may include a main winding 511, an auxiliary winding 512 and other windings. The secondary side 510b may include a main winding 513 and other windings. The primary side 510a windings 511, 512 are connected to the input section 520. The secondary side 510b winding 513 is connected to the output section 130.

The secondary main winding 513 includes an upper terminal 513u, a lower terminal 513l and a center tap 513c. The upper terminal 513u and the center tap 513c define an upper portion of the secondary main winding 513. The lower terminal 513l and the center tap 513c define a lower portion of the secondary main winding 513.

The input section 520 includes a shutdown section 525, discussed below.

The output section 530 may comprise first and second rectifiers 531, 532, first, second resistors 537, 538 and a choke 539, as well as other circuit elements. The rectifiers 531, 532 are driven by the main secondary winding 513.

Although specific devices are shown in the power conversion circuits 100, 800, substitutes and alternatives are possible and may be desirable and necessary.

Description of Processes

Figure 2:
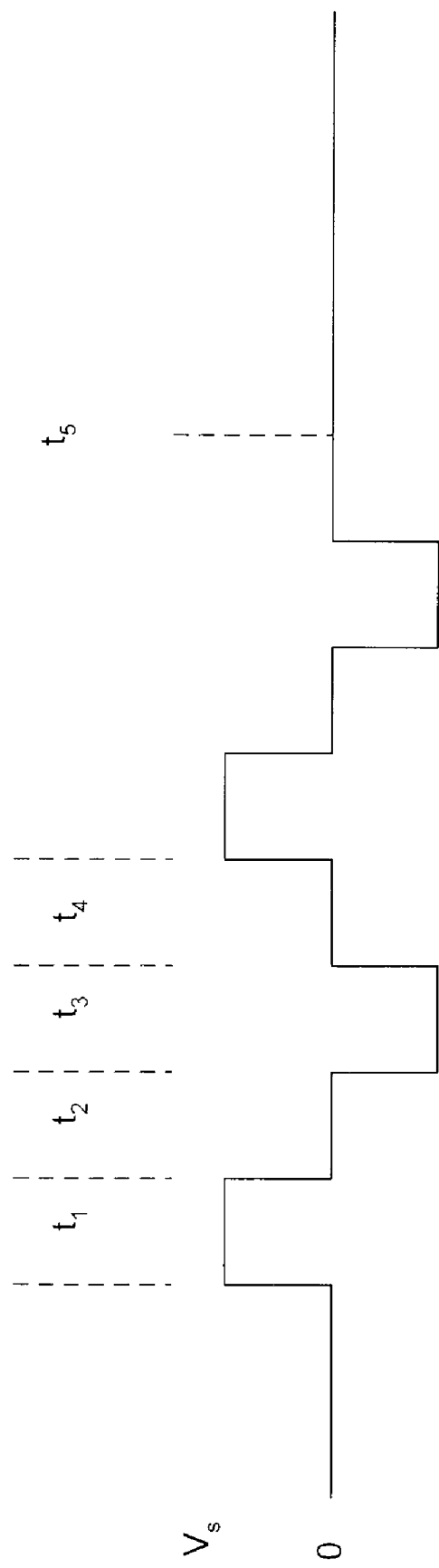
FIG. 2 is a driving voltage waveform.

The power conversion circuits shown in FIGS. 1 and 5 are similar. Thus, the operation of only the power conversion circuit 100 of FIG. 1 is described, except where there are significant differences. Operation of the output section 130 is described with respect to a driving voltage waveform as shown in FIG. 2. In FIG. 2, the driving voltage $V_s$ is depicted as a series of rectangular pulses having a predetermined duty cycle that alternate between a positive voltage and a negative voltage. The input section 120 may be configured to provide such a waveform.

During the positive portion of the conduction cycle (e.g., time $t_1$), the driving voltage $V_s$ and the gate drive voltage $V_g$ are positive, causing the first rectifier 131 to turn on and the second rectifier 132 to turn off. This forms a current path through the lower portion of the main winding 113. Conversely, during the negative portion of the conduction cycle (e.g., time $t_3$), the driving voltage $V_s$ and the gate drive voltage $V_g$ are negative, causing the first rectifier 131 to turn off and the second rectifier 132 to turn on. This forms a current path through the upper portion of the main winding 113. Thus, the auxiliary winding 114 provides synchronicity between the first and second rectifiers 131, 132 by alternatively connecting the upper and lower terminals 114u, 114l of the auxiliary winding 114 to respective gates of the first and second rectifiers 131, 132. The conduction cycle may also have dead times (e.g., time $t_2$, $t_4$).

After $V_{in}$ is removed (e.g., time $t_5$), the output voltage $V_{out}$ should also drop to zero. However, stored energy may be present in the output section 130, for example in the form of a prebias voltage from the output and stored energy in one or more of the capacitors 134, 136. This stored energy can drive the output section 130 such that the rectifiers 131, 132 continue to oscillate on/off. The sustained oscillation at turn off may also occur due to a resonance between the transformer magnetizing inductance and/or leakage inductance and the gate capacitances of the rectifiers 131, 132.

Thus, the rectifiers 131, 132 form a Royer style oscillator with the transformer 110, so that $V_{out}$ will be non-zero for a period of time until the stored energy is dissipated to a minimum level (e.g., zero). When the first rectifier 131 is on, energy is pulled through the transformer 110 and the first rectifier's gate is discharged, turning the first rectifier 131 off. While this is happening, the second rectifier's gate is being charged and the second rectifier 132 will turn-on as the first rectifier 131 turns off. The cycle begins anew with the second rectifier 132 pulling current through the transformer 110, discharging the second rectifier's gate and charging the first rectifier's gate. This oscillation may be lower or higher frequency than normal and possibly high power.

Figure 3:
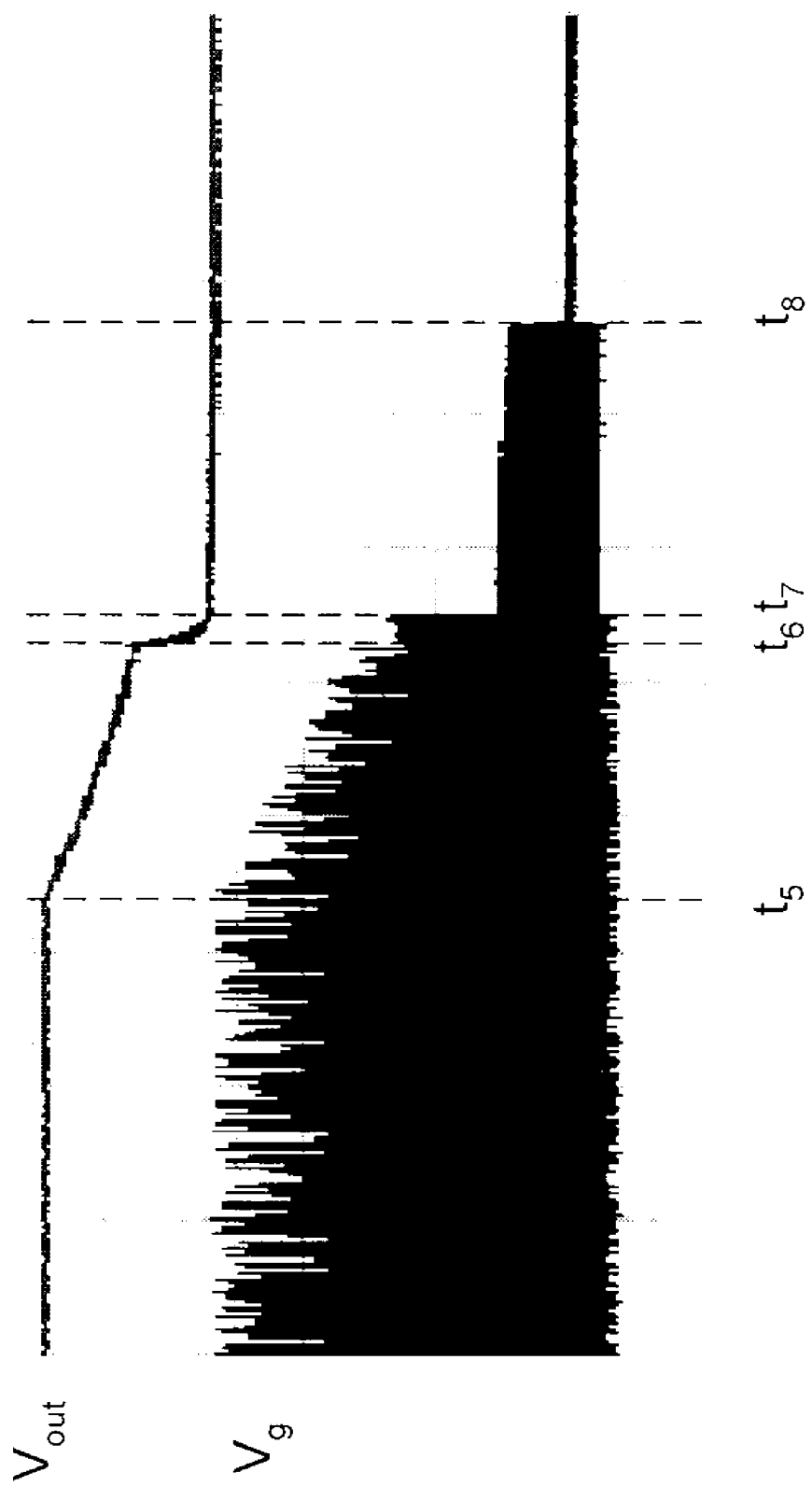
FIG. 3 is a graph depicting output and gate drive voltage waveforms of a power conversion circuit without shutdown control.

The oscillation can be seen in FIG. 3. This graph shows the output voltage $V_{out}$ and the gate drive voltage $V_g$. (FIG. 3 includes time designations $t_6$, $t_7$, $t_8$ and $t_9$. These time designations are not related to the time designations in FIG. 2, or those in FIG. 4.)

Up until time $t_6$, the output voltage $V_{out}$ and the gate drive voltage $V_g$ are roughly constant. At time $t_6$, power to the input section is removed and the input voltage $V_g$ falls off until time $t_7$ and rapidly drops to a minimum at time $t_8$. When the power converter is turned off, the input voltage $V_{in}$ and output voltage $V_{out}$ will decay to the UVLO. At this point the power converter will shut itself off. At this point if the shutdown section 160 is not present the power conversion circuit 100 may self oscillate as in FIG. 3. It may continue to oscillate until the gate drive voltage $V_g$ has decayed to a value that does not permit self-oscillation.

From time $t_6$ until time $t_7$, the gate drive voltage $V_g$ decreases as the output voltage $V_{out}$ decreases. At time $t_7$, the power converter hits the UVLO and the synchronous rectifiers begin to self oscillate until a later time $t_9$ when the stored energy has been discharged to a threshold level.

Once the rectifier oscillation is initiated, the duration for which it continues depends on the stored energy in the power conversion circuit, the Q of the gate drive circuit capacitances and the linked inductance. The damping resistance in this circuit is small, and an effective way to stop the oscillations is reduction of the stored energy or the Q of the circuit.

For purposes of simplicity and clarity, it is enough to consider two capacitances linked by an inductor. The characteristic impedance Zo of the output section 130 is $$\sqrt{\frac{L}{C}} \text{ and}$$

the Q of the circuit is Zo/R. By "characteristic impedance," it is meant the impedance (resistance) to energy transfer associated with wave propagation in a line that is much longer than the wavelength, thereby giving the ratio of voltage to current when there are no reflections. When the gate drive oscillations set in, the L is nothing but the reflected magnetizing inductance, and C the equivalent gate capacitance. For example, if the reflected L is 4 uH, and effective C is 3000 pF, the characteristic impedance is 1333. If the resistance is small, say 1 ohm, the Q is 1333. In short, given the low resistance and high inductance, the stored energy could be large even with a seemingly large gate capacitance in the circuit.

The situation is more critical in the event that a source is present on the output, where such oscillations can draw energy from the source and be self sustaining. In this case, it is imperative that the ratio of the stored energy to the work done is as small as possible, since this could be self destructive to the rectifiers 131, 132. Also the power down of the power conversion circuit 100 is not desirable since the output section 130 continues to switch as long as an external voltage is present.

A power conversion circuit, such as that shown in FIG. 1, therefore may include a means for reducing self-oscillation between its first synchronous rectifier and second synchronous rectifier after power to its input section has been removed. This may be accomplished in a number of ways.

A shorted turn may be placed on the transformer. For example the main winding or the auxiliary winding of the primary side may be shorted. However, any low impedance winding section can be shorted to yield the same result, including those of the secondary side. Shorting the transformer reduces the inductance in the circuit and stops the coupling of energy from one transformer winding to another. Shorting the transformer and other selected solutions will turn on both synchronous rectifiers leading to a rapid depletion of energy stored in the power conversion circuit. This solution reduces the characteristic impedance Zo by several orders of magnitude. Thus, energy transfer to the gates of the synchronous rectifiers is stopped by placing a shorted turn on the primary side of the transformer. The shorted turn limits the energy transfer through the transformer to a very low level.

One embodiment of the shorted-transformer solution is the shutdown section 125 shown in FIG. 1. The shutdown section 125 is connected to the power input $V_{in}$ so that removal of power may be detected. The shutdown section 125 is interposed between one or both of the main winding 111 and auxiliary winding 112 of the primary side 110a, and their respective connections 121, 122 to the input section 120. When the shutdown section 125 detects that $V_{in}$ has been removed or turned off, the rapid shutdown section 125 shorts one or both of the primary windings 111, 112.

With this solution, the turn-off oscillation now changes to a higher frequency, lower power oscillation which involves the synchronous rectifiers operating briefly in the linear region as they turn the power off. This allows the voltages on the gates of the synchronous rectifiers to be lowered continuously, and they will fall below the turn-on threshold of the synchronous rectifiers. With the reduction in transformer/inductor energy the circuit stays in this state for a much shorter time period. The result is a soft turn-off of the output voltage $V_{out}$.

By shunting the magnetizing inductance and transferring the resonance to a "leakage" inductance, the value of Zo is now $$\sqrt{\frac{L_{lk}}{C}}.$$

The stored energy is reduced by a factor of $$\sqrt{\frac{L}{\frac{L}{lk}}}.$$

Figure 4:
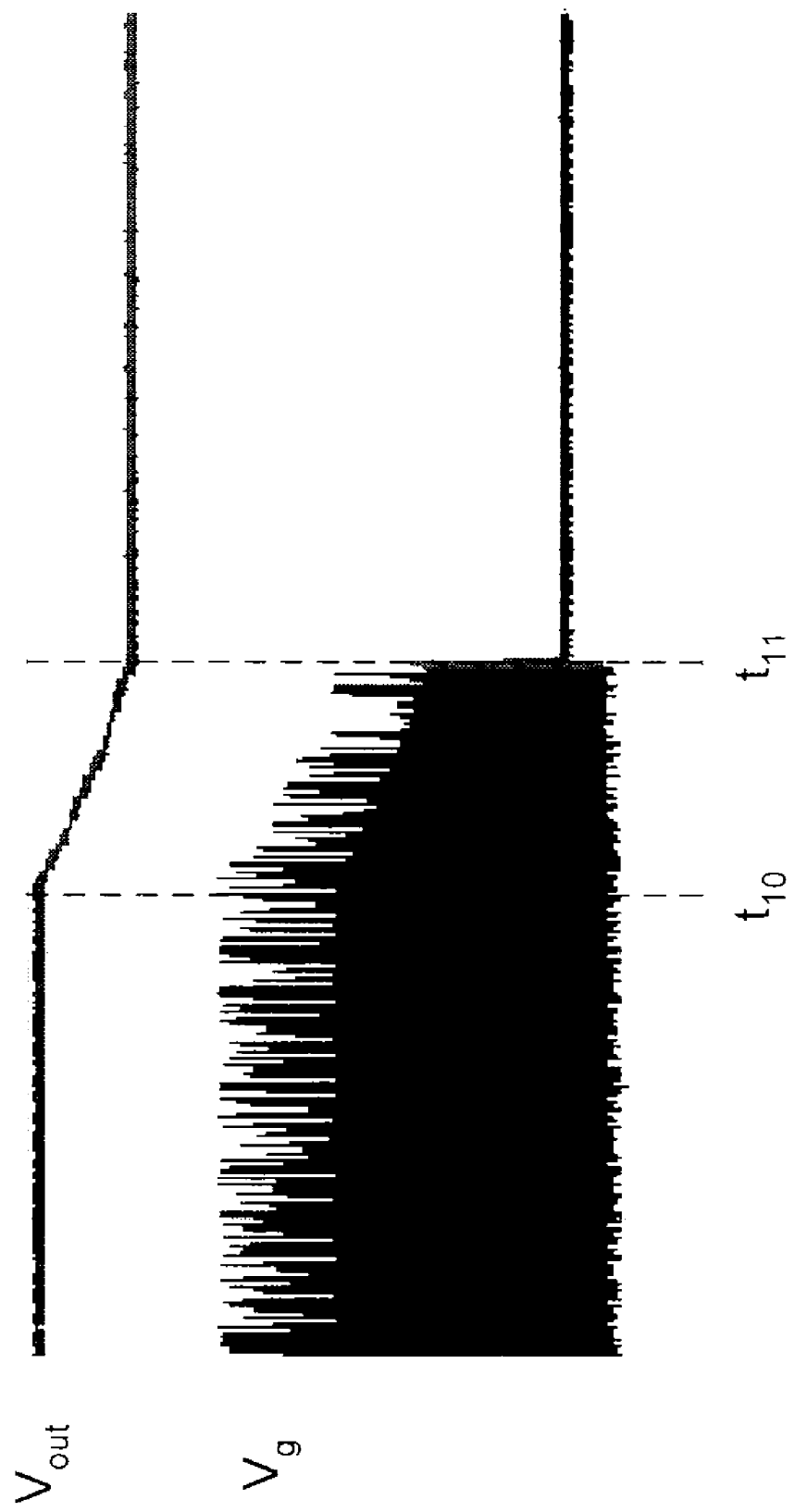
FIG. 4 is a graph depicting output and gate drive voltage waveforms of a power conversion circuit with shutdown control.

FIG. 4 shows that the operation of the synchronous rectifiers quickly stops after the main drive winding is shorted. As in FIG. 3, up until time $t_{10}$, the output voltage $V_{out}$ and the input voltage $V_{in}$ are roughly constant. At time $t_{10}$, power to the input section is removed and the input voltage $V_{in}$ falls off to zero at time $t_{11}$. From time $t_{10}$ until time $t_{11}$, the gate drive voltage $V_g$ decreases as the output voltage $V_{out}$ decreases. After the input voltage $V_{in}$ drops to the UVLO at time $t_{11}$, the output circuit is no longer being supplied power from the primary side of the transformer. At time $t_{11}$ the shorted primary winding has caused all oscillations to cease.

In addition to turn-off, a power converter may have other times when a controlled shutdown may be desired. For example, in some power conversion circuits, there is a period of dead time during switching. This dead time is shown in FIG. 2 as times $t_2$ and $t_4$. Thus, the shutdown section 160 may be activated (e.g., the control section 165 may send a signal on its output 166) every cycle during the dead time (e.g., times $t_2$, $t_4$). This may improve the efficiency of the power conversion circuit 100 by increasing its efficiency during switching transitions.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A power conversion circuit comprising
    a transformer having a primary side and a secondary side
    an input section connected to the primary side
    an output section connected to the secondary side and comprising a first self-driven synchronous rectifier and a second self-driven synchronous rectifier
    a shutdown section comprising
        a control section adapted to detect a predetermined condition
        means for shorting a winding of the transformer upon detection of the predetermined condition, wherein shorting the winding on the transformer reduces self-oscillation between the first self-driven synchronous rectifier and the second self-driven synchronous rectifier.

2. The power conversion circuit of claim 1 wherein the shutdown section comprises means for shorting a main winding of the primary side of the transformer.

3. The power conversion circuit of claim 2 wherein
    the input section comprises four switches to drive the main winding of the primary side of the transformer, said switches disposed as an upper pair and a lower pair
    the shutdown section comprises means for turning on a pair of switches selected from the group comprising the upper pair of switches and the lower pair of switches.

4. The power conversion circuit of claim 3 wherein the shutdown section includes a DC blocking capacitor in series with the main winding of the primary side of the transformer.

5. The power conversion circuit of claim 1 wherein the shutdown section comprises means for shorting an auxiliary winding of the primary side of the transformer.

6. The power conversion circuit of claim 1 wherein the predetermined condition is selected from the group comprising falling below an undervoltage lockout point level, over-current, and over-temperature.

7. A power converter comprising the power conversion circuit of any of claims 1-6.

8. A method of operating a power converter including a transformer comprising a primary side and a secondary side, an input section connected to the primary side, and an output section connected to the secondary side comprising first and second self-driven synchronous rectifiers, the method comprising
    sensing a predetermined condition
    shutting down said power converter in response to sensing the predetermined condition
    shorting a winding on the transformer in response to sensing the predetermined condition, wherein shorting a winding on the transformer reduces self-oscillation between the first synchronous rectifier and the second synchronous rectifier after shutting down said power converter.

9. The method of operating a power converter of claim 8 wherein shorting a winding comprises shorting a main winding of the primary side of the transformer.

10. The method of operating a power converter of claim 9 wherein
    the input section comprises four switches to drive the main winding of the primary side of the transformer, said switches disposed as an upper pair and a lower pair
    shorting a winding further comprises turning on a pair of switches selected from the group comprising the upper pair of switches and the lower pair of switches.

11. The method of operating a power converter of claim 8 wherein shorting a winding comprises shorting an auxiliary winding of the primary side of the transformer.

12. The method of operating a power converter of claim 8 wherein the predetermined condition comprises removal of external power from the input section.

13. The method of operating a power converter of claim 8 wherein the predetermined condition is selected from the group comprising falling below an undervoltage lockout point level, over-current and over-temperature.

* * * * *

UNITED STATES PATENT AND TRADEMARK OFFICE
CERTIFICATE OF CORRECTION

| | | |
|---|---|---|
| PATENT NO. | : 7,333,350 B2 | |
| APPLICATION NO. | : 11/614908 | |
| DATED | : February 19, 2008 | |
| INVENTOR(S) | : Williams et al. | |

It is certified that error appears in the above-identified patent and that said Letters Patent is hereby corrected as shown below:

Title page, Item (73) Assignee: replace "Assignee: Power One, Inc." with --Assignee: Power-One, Inc.--

Signed and Sealed this

Tenth Day of June, 2008

JON W. DUDAS
*Director of the United States Patent and Trademark Office*